E. A. JONES.
PNEUMATIC TIRE.
APPLICATION FILED JULY 8, 1914. RENEWED AUG. 23, 1918.
1,285,722.
Patented Nov. 26, 1918.
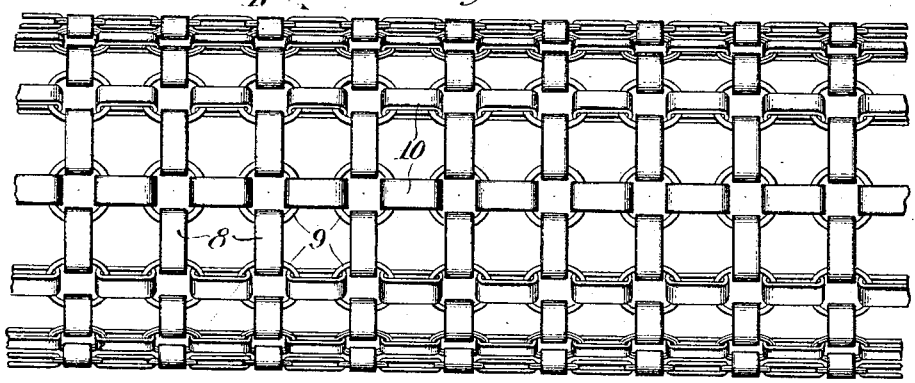
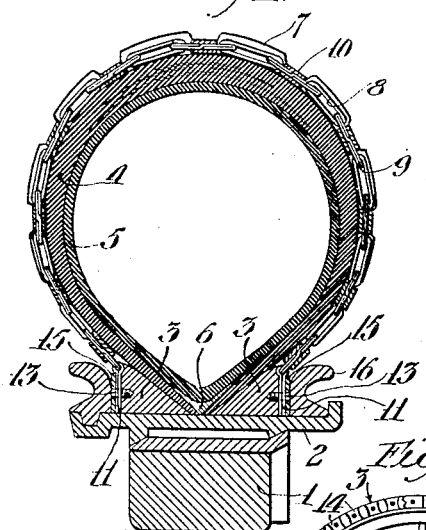
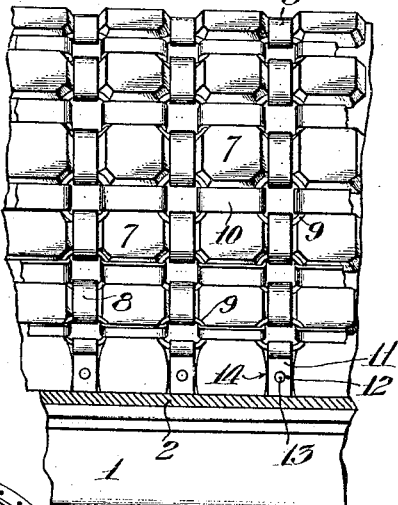
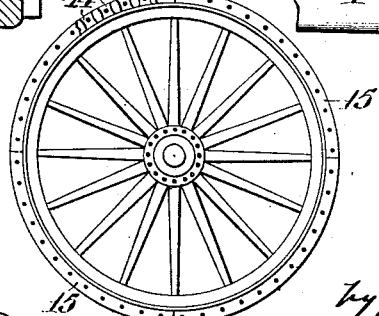
Witnesses:—
Inventor
Eugene A. Jones

UNITED STATES PATENT OFFICE.

EUGENE A. JONES, OF LOS ANGELES, CALIFORNIA, ASSIGNOR TO JONES HOLDING SYNDICATE, OF SEATTLE, WASHINGTON, A CORPORATION OF WASHINGTON.

PNEUMATIC TIRE.

1,285,722.      Specification of Letters Patent.      Patented Nov. 26, 1918.

Application filed July 8, 1914, Serial No. 849,853. Renewed August 23, 1918. Serial No. 251,565.

*To all whom it may concern:*

Be it known that I, EUGENE A. JONES, a citizen of the United States, residing at Los Angeles, in the county of Los Angeles, State of California, have invented a new and useful Pneumatic Tire, of which the following is a specification.

Pneumatic tires as usually constructed for automobiles consist of an outer casing in which is inclosed an inner tube adapted to receive air under pressure, the outer casing being secured to the rim of the wheel by any one of various forms of fastening devices. The outer casings of tires under the common forms of construction above referred to are formed of canvas and rubber and must be made of sufficient strength to withstand not only considerable wear due to friction of the road surface but also such casings must take all of the strain on the tire due to the air pressure within the inner tube. It is difficult to manufacture such a casing free of latent defects, very frequently even a new casing will blow out within a short time from when the same is first placed in use. One of the main objects of my invention is to produce a pneumatic tire in which is employed a combination of a casing of rubber and canvas together with metal so arranged that the metal structure of the tire relieves the casing of substantially all of the strain due to the air pressure within the tire, the casing simply acting as a shoe or filler between the inner tube and the metal portion of the tire. Another object of my invention is to so construct a tire of the character described that the metal portion of the tire while exterior of the rubber portion of the same is so arranged that there is a minimum amount of friction between the metal and the rubber portion of the tire.

Referring to the drawings which are for illustrative purposes only:

Figure 1 is a cross sectional view of a tire embodying a form of my invention.

Fig. 2 is a side elevation of the tire shown in Fig. 1.

Fig. 3 is a plan view of the metal portion of the tire.

Fig. 4 is a side elevation of a wheel having a portion of the tire fastening means thereon.

1 designates the felly of a wheel and 2 the rim of the wheel secured thereto in any suitable manner. Seated upon the rim 2 is a metal base member consisting of split rings 3 formed of metal, the rings 3 being formed in two parts as shown in Fig. 4. The outer faces of the rings 3 taper downwardly toward each other to form a seat to receive the inner ends of a rubber casing 4 of the tire. 5 designates an inner rubber tube of ordinary construction between which and the inner ends of the rubber casing 4 is placed a strip or filler of canvas or other similar material 6. The rubber casing 4 is of similar shape and construction to the ordinary carcass or casing in use on pneumatic tires, consisting of a rubber composition reinforced with strips of canvas, with the exception that the rubber casing 4 used in my invention may be of much lighter construction as more fully hereinafter described. Another difference between the rubber casing 4 and that of the ordinary construction is that the rubber casing 4 is provided on its outer surface with a series of projections or knobs 7 of rubber formed integral with the body of the casing. The spacing between the knobs 7 is adapted to receive the metal portion or metal casing of the tire as hereinafter described. The metal portion of the tire, or metal casing "B" consists of rows or series of transversely arranged alternate flat links 8 and split rings 9, of the key ring type. The split rings 9 of the respective rows being connected longitudinally of the tire by means of flat links 10. The inner split ring 9 of each row is provided with a flat eye 11 perforated as indicated at 12 to receive a pin 13 projecting outwardly from the respective rings 3 of the base of the tire, the flat eyes 11 being seated in notches or depressed portions 14 formed in the sides of the respective rings 3. 15 designates locking rings which are each formed in two parts and are provided with perforations adapted to receive the outer end of the pins 13 and retain the flat eyes 11 in their respective notches 14 on the rings 3, thereby securely fastening the metal casing to the base of the tire. The locking rings 15 are secured in proper position in engagement with the pins 13 by means of clamping rings 16 of any common form ordinarily used for retaining pneumatic tires on the rim of the wheel. The knobs 7 of the casing 4 extend upwardly between the links 8 of the respective rows and the connecting links 10, the knobs 7 on the tread of the tire being formed of considerably more height than those at the sides of the casing. It is to be understood that the rings and links of the metal casing may also be made of heavier material on the tread portion of the tire.

It will be readily understood from the above description that my invention primarily consists of an inner rubber tube and an outer rubber casing seated upon a metallic base formed of the rings 3, the outer rubber casing 4 being securely held in place thereon by means of the metal casing of the tire which in turn is securely fastened to the metal base rings 3 by means of the pins 13 as heretofore described. It will be noted that the construction of the casing with the knobs 7, extending through the openings formed between the links of the armor prevents any relative movement between the casing and the metal portion of the tire and thereby reduces the friction between the metal and the casing to a minimum. It is to be further noted that the metal casing substantially covers the entire rubber casing and that the greatest area of the exposed portion of the rubber casing is that portion thereof upon which is formed the knobs, or in other words, that portion to which additional thickness of rubber is added.

The metal casing being exposed on the tread of the tire prevents any considerable wear to the tread of the rubber casing, at the same time the metal casing forming a network over the rubber casing the danger of blow outs from defects in the rubber casing is cut down to a minimum.

While I have described the rings 9 as split rings of the key ring type it is understood that they may be made of the closed ring type. In the form shown it will be readily understood that in the event that repairs should be necessary to the metal casing a few of the rings 9 and links 8 and 10 may be removed without demounting the entire tire.

It it also to be noted that the metal base member, consisting of the rings 3, the said rings 3 being split as heretofore described, may be placed upon any of the well known forms of rims commonly used upon wheels for the attachment of pneumatic tires thereto, the base member so constituted being a portion and an essential element of the tire itself.

I claim as my invention:

In combination, a rim, a metallic base on said rim, a rubber casing on said base, an inner tube in said rubber casing, a flexible metallic casing over said rubber casing, means on said base for engaging said metallic casing, locking rings adapted to secure said metallic casing in engagement with the engaging means on said base, and clamping rings on said rim for retaining said locking means.

In testimony whereof, I have hereunto set my hand at Los Angeles, California, this 2nd day of July, 1914.

EUGENE A. JONES.

In presence of—
FRANK L. A. GRAHAM,
FRED A. MANSFIELD.

Copies of this patent may be obtained for five cents each, by addressing the "Commissioner of Patents, Washington, D. C."